US012585217B2

(12) United States Patent
Nguyen

(10) Patent No.: US 12,585,217 B2
(45) Date of Patent: Mar. 24, 2026

(54) IMAGE FORMING APPARATUS

(71) Applicant: KYOCERA Document Solutions Inc., Osaka (JP)

(72) Inventor: Duong Tung Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 126 days.

(21) Appl. No.: 18/614,567

(22) Filed: Mar. 22, 2024

(65) Prior Publication Data

US 2024/0329574 A1 Oct. 3, 2024

(30) Foreign Application Priority Data

Mar. 28, 2023 (JP) ................................ 2023-051826

(51) Int. Cl.
*G03G 15/20* (2006.01)
*G03G 15/00* (2006.01)

(52) U.S. Cl.
CPC ..... *G03G 15/2035* (2013.01); *G03G 15/2064* (2013.01); *G03G 15/657* (2013.01); *G03G 15/751* (2013.01)

(58) Field of Classification Search
None
See application file for complete search history.

(56) References Cited

U.S. PATENT DOCUMENTS

2010/0028044 A1* 2/2010 Matsuo .............. G03G 15/2035 399/122
2019/0163121 A1 5/2019 Wada et al.
2023/0280675 A1* 9/2023 Minoshima ........ G03G 15/2028 399/122
2023/0314985 A1* 10/2023 Ikeno .................. G03G 15/167 399/37
2024/0319662 A1* 9/2024 Minoshima ........ G03G 21/1842
2024/0329573 A1* 10/2024 Minoshima ........ G03G 21/1633
2025/0044735 A1* 2/2025 Minoshima ........ G03G 15/2017
2025/0172891 A1* 5/2025 Minoshima .......... G03G 21/206
2025/0172903 A1* 5/2025 Minoshima ........ G03G 21/1633
2025/0181015 A1* 6/2025 Ohira ................. G03G 15/2017

FOREIGN PATENT DOCUMENTS

JP 2019101165 A 6/2019

* cited by examiner

*Primary Examiner* — Sevan A Aydin
(74) *Attorney, Agent, or Firm* — Studebaker Brackett PLLC

(57) ABSTRACT

An image forming apparatus includes an attachable/detachable member, a fixing device, a shutter, an opening/closing interlocking part, and a pressing interlocking part. The fixing device is provided on an upstream side of the attachable/detachable member in a draw-out direction of the attachable/detachable member, and fixes a toner image on a medium passing through a pressurized area formed between a heating member and a pressing member. The opening/closing interlocking part moves the shutter to an opening position when the attachable/detachable member is attached, and moves the shutter to a closing position when the attachable/detachable member is drawn out. The pressing interlocking part moves the heating member in a direction of pressing it against the other when the shifter is moved to the closing position, and moves the heating member in a direction of separating it away from the other when the shutter is moved to the closing position.

4 Claims, 14 Drawing Sheets

IMAGE FORMING APPARATUS

INCORPORATION BY REFERENCE

This application is based on and claims the benefit of priority from Japanese patent application No. 2023-051826 filed on Mar. 28, 2023 which is incorporated by reference in its entirety.

BACKGROUND

The present disclosure relates to an image forming apparatus.

An image forming apparatus for forming an image on a sheet by an electrophotographic method is provided with a fixing device which heat-fixes a toner image to the sheet by heating the toner image while pressurizing it. The fixing device is provided with a shutter movable to a closing position covering the heated rotating body and an opening position exposing the heated rotating body. For example, when the user opens the apparatus main body, such as when the sheet is jammed in the pressurized area of the fixing device, the shutter is moved from the opening position to the closing position. Thus, the user can remove the jammed sheet without touching the heated rotating body.

However, in the above-described technique, it is possible to prevent the user from touching the heated rotating body by moving the shutter to the closing position, but there is a problem that the jammed sheet (which has caused a conveyance failure) cannot be easily removed because it is tightly held in the pressurized area.

SUMMARY

An image forming apparatus according to the present disclosure includes an attachable/detachable member, a fixing device, a shutter, an opening/closing interlocking part, and a pressing interlocking part. The attachable/detachable member is detachably attached to an apparatus main body. The fixing device is provided on an upstream side of the attachable/detachable member in a draw-out direction of the attachable/detachable member, and configured to heat-fix a toner image on a medium passing through a pressurized area formed between a heating member and a pressing member. The shutter is provided to be movable between an opening position for exposing the heating member and a closing position for covering the heating member. The opening/closing interlocking part is configured to move the shutter to the opening position when the attachable/detachable member is attached to an attachment position of the apparatus main body, and to move the shutter to the closing position when the attachable/detachable member is drawn out from the attachment position. The pressing interlocking part is configured to move one of the heating member and the pressing member in a direction of pressing it against the other to bring the pressurized area into a pressure increased state when the shutter is moved to the opened state, and to move one of the heating member and the pressing member in a direction of separating it away from the other to bring the pressurized area into a pressure decreased state when the shutter is moved to the closing position.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
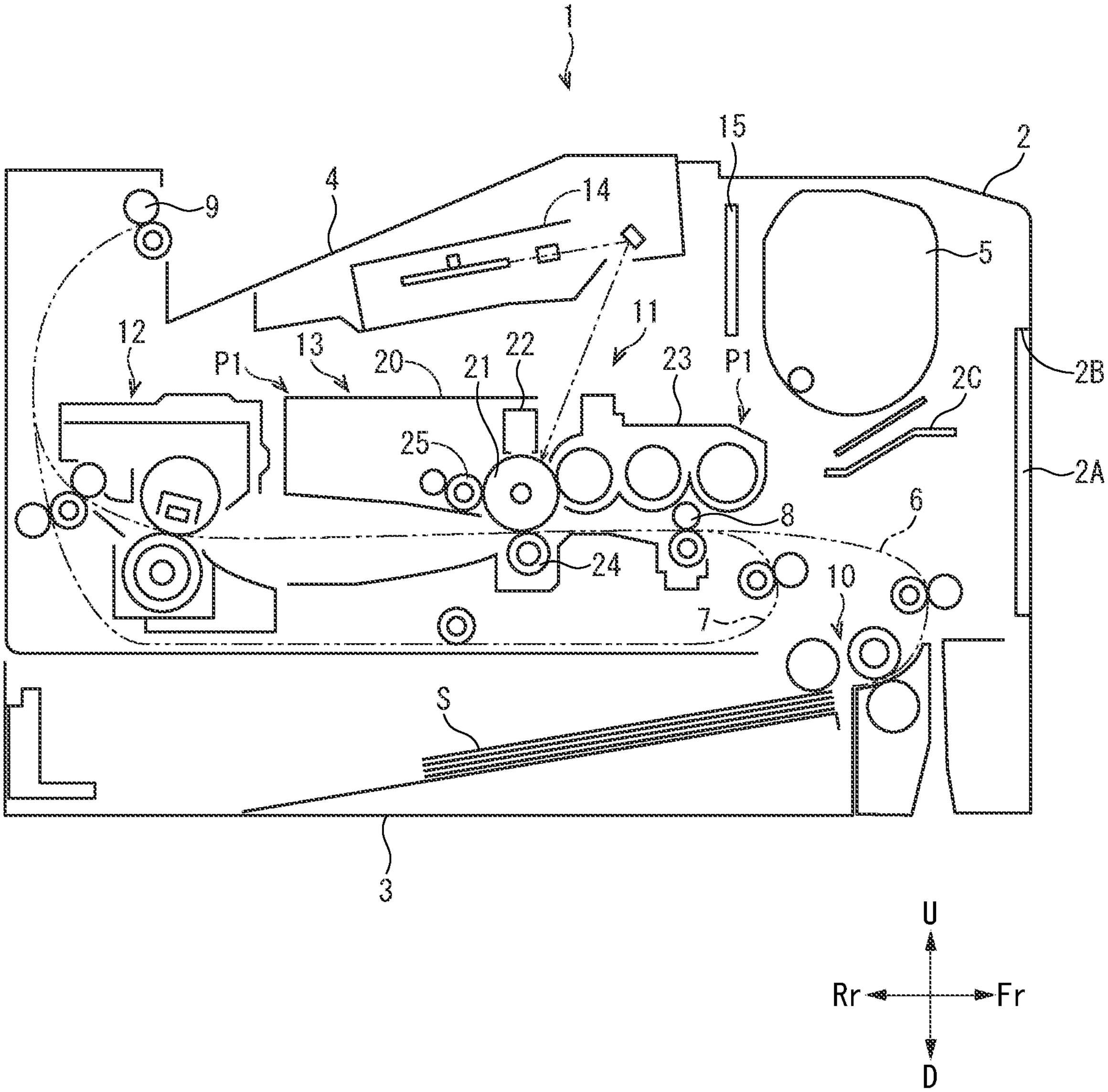
FIG. 1 is a schematic view (side view) showing an internal structure of an image forming apparatus according to one embodiment of the present disclosure.

Hereinafter, with the attached drawings, one embodiment of the present disclosure will be described. Note that Fr, Rr, L, R, U, and D shown in the drawings indicate the front, rear, left, right, upper, and lower. Although directional and positional terms are used herein, they are used for convenience of description and do not limit the technical scope of the present disclosure.

Figure 2:
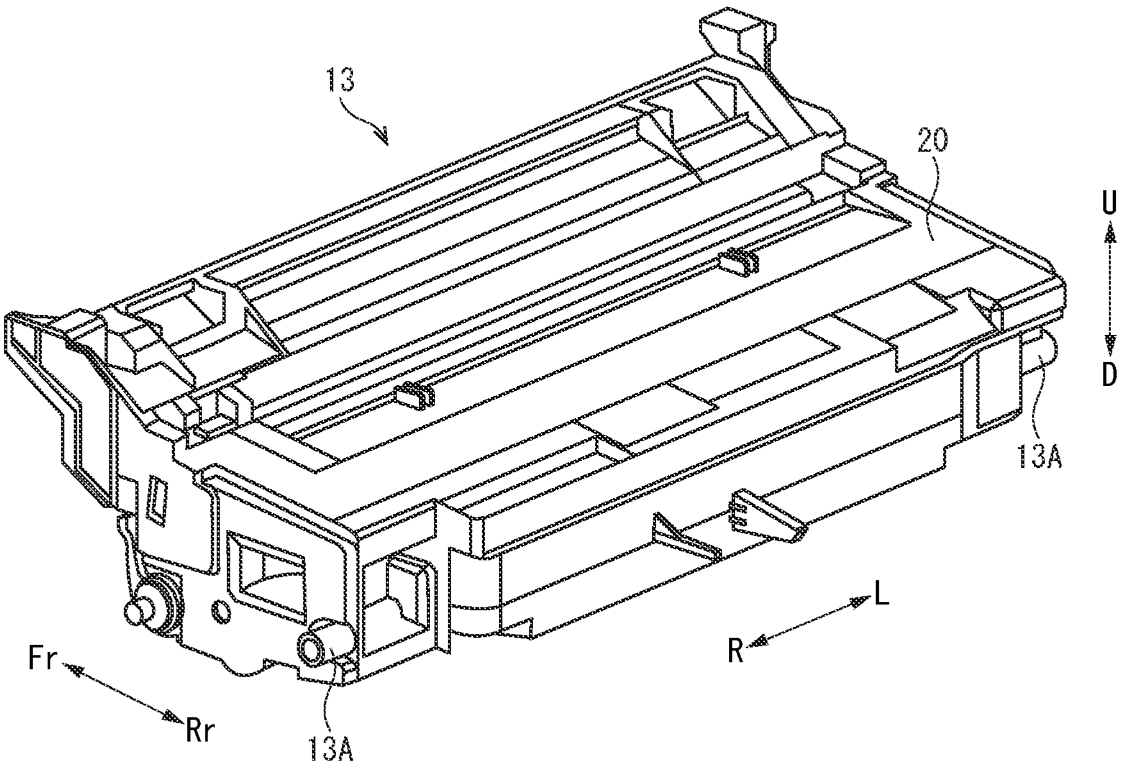
FIG. 2 is a perspective view showing a drum unit of the image forming apparatus according to the embodiment of the present disclosure.
Figure 3:
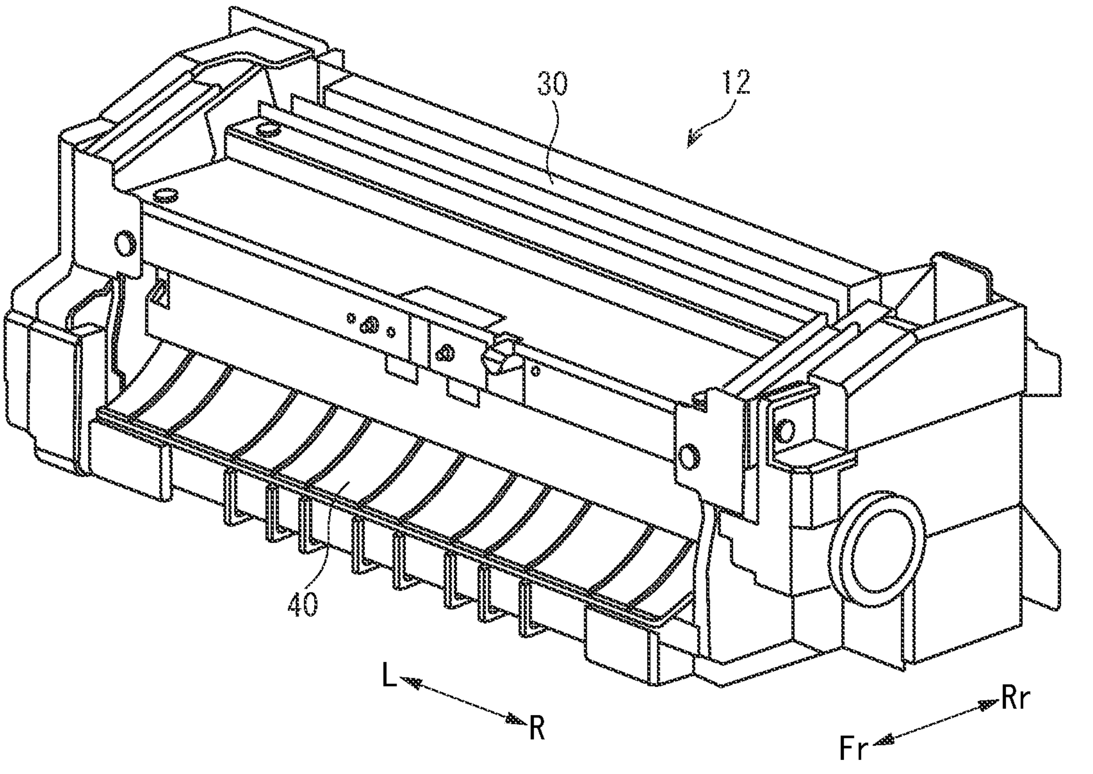
FIG. 3 is a perspective view showing a fixing device of the image forming apparatus according to an embodiment of the present disclosure.
Figure 4:
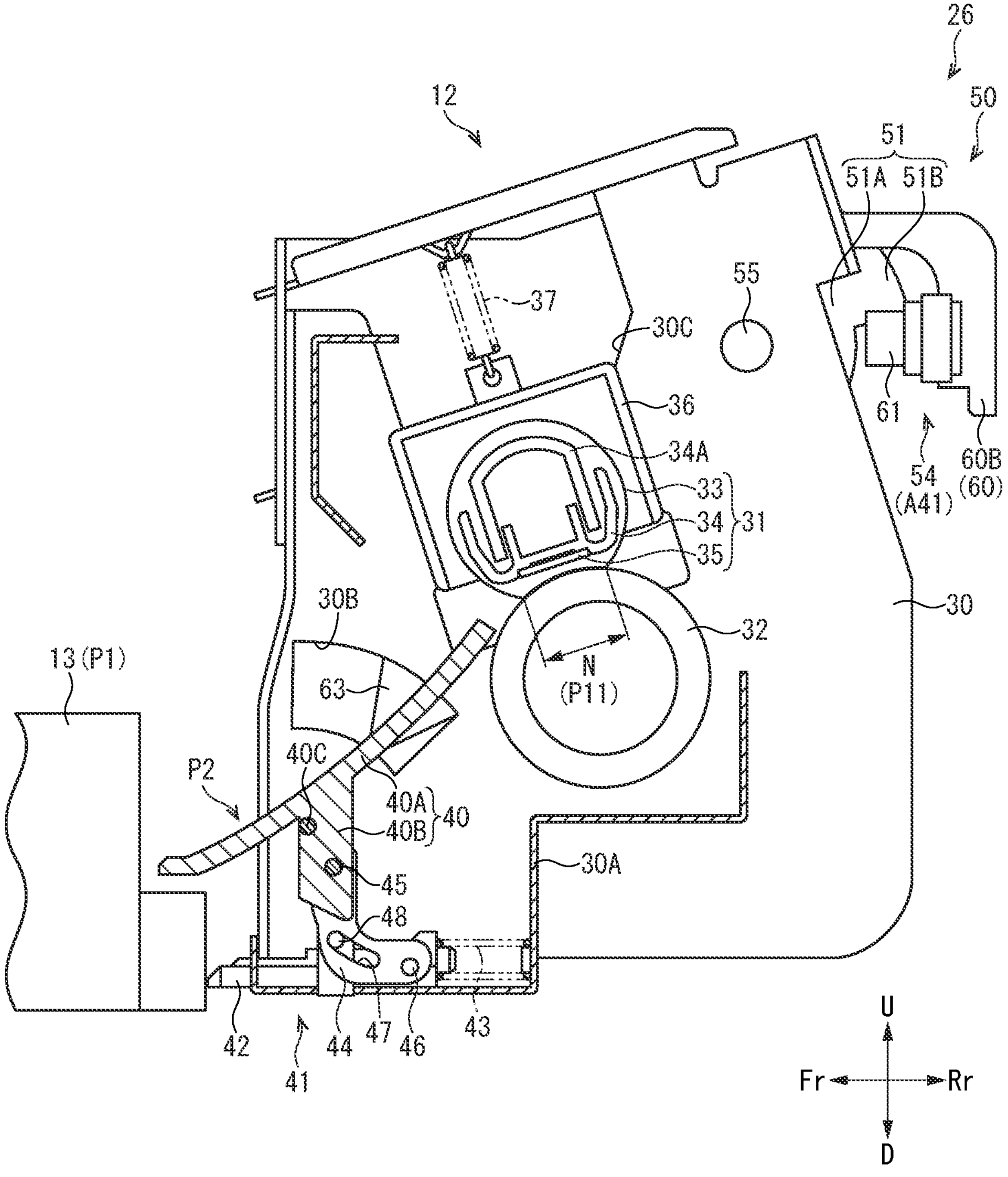
FIG. 4 is a cross-sectional view (right side view) showing the fixing device (at a waiting time) and a jam treatment support part of the image forming apparatus according to the embodiment of the present disclosure.

[Image Forming Apparatus] The image forming apparatus 1 will be described with reference to FIG. 1 to FIG. 4. FIG. 1 is a schematic view (side view) showing the internal structure of the image forming apparatus 1. FIG. 2 is a perspective view showing a drum unit 13. FIG. 3 is a perspective view showing a fixing device 12. FIG. 4 is a cross-sectional view (right side view) showing the fixing device 12 (in a standby state) and a jam treatment support part 26.

The image forming apparatus 1 is a printer which forms an image by transferring a toner image formed by an electrophotographic method onto a sheet S (medium). As shown in FIG. 1, the image forming apparatus 1 includes an apparatus main body 2 constituting a substantially rectangular parallelepiped appearance. In the lower portion of the apparatus main body 2, for example, a sheet feeding cassette 3 in which the sheet S is stored is detachably provided. On the upper surface of the apparatus main body 2, a sheet discharge tray 4 is provided. In the upper portion of the inside of the apparatus main body 2, a toner container 5 storing toner (developer) for replenishment is detachably provided. A main body cover 2A is provided on the front surface of the apparatus main body 2 so as to be openable and closable, and a maintenance opening 2B is exposed on the front surface of the apparatus main body 2 by opening the main body cover 2A. The sheet S as an example of the medium is not limited to the sheet made of paper, but may be a sheet made of resin or the like.

In the apparatus main body 2, a conveyance path 6 and an inversion conveyance path 7 serving as a path for conveying the sheet S are formed. The conveyance path 6 is formed in a substantially S-shape from the front lower portion to the rear upper portion of the apparatus main body 2, and is a path along which the sheet S is conveyed from the sheet feeding cassette 3 to the sheet discharge tray 4. The inversion conveyance path 7 branches downward on the downstream side portion of the conveyance path 6, extends forward, and merges with the upstream side portion of the conveyance path 6. The inversion conveyance path 7 is a path for inverting the sheet S and re-conveying it to an image forming unit 11 (described later). A registration rollers pair 8 for correcting skew of the sheet S to be conveyed toward the image forming unit 11 is disposed near the merging portion of the conveyance path 6 with the inversion conveyance path 7. A sheet discharge rollers pair 9 for discharging the sheet S having the image S toward the sheet discharge tray 4 is disposed at the downstream end of the conveyance path 6.

The image forming apparatus 1 includes a sheet feeding device 10, the image forming unit 11, and a fixing device 12. The sheet feeding device 10 is provided at the upstream end of the conveyance path 6, and feeds the sheet S from the sheet feeding cassette 3 toward the conveyance path 6. The image forming unit 11 is provided in the intermediate portion of the conveyance path 6, and forms the toner image on the sheet S. The fixing device 12 is provided on the downstream side portion of the conveyance path 6, and heat-fixes the toner image on the sheet S.

<Image Forming Unit> The image forming unit 11 includes a drum unit 13, a developing device 23, a transfer roller 24, and an optical scanning device 14. The drum unit 13 and the developing device 23 are provided inside the apparatus main body 2 in a detachable and attachable manner. The transfer roller 24 and the optical scanning device 14 are attached to the inside of the apparatus main body 2 in a undetachable manner.

As shown in FIG. 1 and FIG. 2, the drum unit 13 as an example of the attachable and detachable member includes a drum housing 20, a photosensitive drum 21, a charging device 22, and a cleaning device 25. The photosensitive drum 21, the charging device 22 and the cleaning device 25 are housed in the drum housing 20.

The photosensitive drum 21 is formed in a substantially cylindrical shape elongated in the left-and-right direction, and is supported by the drum housing 20 in a rotatable manner around an axis. The photosensitive drum 21 is rotated around the axis by a motor (not shown). A part of the outer circumferential surface of the photosensitive drum 21 is exposed through an opening formed in the drum housing 20.

The charging device 22 and the cleaning device 25 are supported by the drum housing 20. The charging device 22 is disposed above the photosensitive drum 21, and the cleaning device 25 is disposed on the rear side of the photosensitive drum 21. The developing device 23 is provided in front of the drum unit 13, and the developing roller faces the photosensitive drum 21. The transfer roller 24 is in contact with the photosensitive drum 21 from below to form a transfer nip. That is, the charging device 22, the developing device 23, the transfer roller 24, and the cleaning device 25 are arranged around the photosensitive drum 21 in the order of the image forming process. The optical scanning device 14 is provided above the drum unit 13, and emits scanning light toward the surface of the photosensitive drum 21.

The drum unit 13 and the developing device 23 are detachably provided in the apparatus main body 2. More specifically, as shown in FIG. 1, the drum unit 13 and the developing device 23 are provided inside the apparatus main body 2 so as to be movable between an attachment position P1 and a take-out position (not shown) which is in front of the attachment position P1. A pair of guide pins 13A (see FIG. 2) protrude from the left and right side plates of the drum housing 20 and the left and right side plates of the developing device 23 (the housing) (the guide pins of the developing device 23 are not shown). The right and left side plates of the apparatus main body 2 are provided with a pair of rails 2C with which the pair of guide pins 13A are engaged. The drum unit 13 and the developing device 23 are positioned by moving them from the attachment position P1 to the take-out position while guiding the guide pins 13A along the rails 2C. The drum unit 13 and the developing device 23 may be drawn out to the outside of the apparatus main body 2 (not shown). That is, the take-out position may be provided outside the apparatus main body 2.

<Fixing Device> As shown in FIG. 1, the fixing device 12 is provided on the rear side of the drum unit 13, that is, on the upstream side in the draw-out direction of the drum unit 13. As shown in FIG. 3 and FIG. 4, the fixing device 12 includes a fixing housing 30, a heating member 31, and a pressing roller 32.

(Fixing Housing) The fixing housing 30 includes a frame made of metal and a member made of synthetic resin fixed to the frame. The fixing housing 30 supports the heating member 31 and the pressing roller 32. The fixing housing 30 is provided with a conveyance guide 40 for guiding the conveyance of the sheet S. The conveyance guide 40 is arranged in front of the heating member 31 and the others, which will be described later, and is provided in a posture inclined upward from the front side to the rear side.

(Heating Member) As shown in FIG. 4, the heating member 31 includes a fixing belt 33, a support member 34, and a heater 35.

The fixing belt 33 is made of flexible material, and is formed in a substantially cylindrical shape elongated in the left-and-right direction. The lateral width (length in the left-and-right direction) of the fixing belt 33 is slightly longer than the lateral width of the sheet S of the largest size.

The support member 34 is arranged so as to penetrate the hollow space of the fixing belt 33 in the right-and-left direction, and the lower surface (sliding surface) is brought into contact with the inner circumferential surface of the fixing belt 33. The support member 34 is fixed to the lower portion of a stay 34A passing through the hollow space of the fixing belt 33. Both the right and left ends of the stay 34A are fixed to a pair of end holders 36 (FIG. 4 and the others show only one). The fixing belt 33 is held in a substantially cylindrical shape by the support member 34 and the pair of end holders 36, and rotates in the circumferential direction while contacting with the sliding surface of the support member 34.

The pair of end holders 36 are mounted so as to be moved (upward and downward) in the upper-and-lower direction along a pair of fixing grooves 30C (FIG. 4 and the others show only one) formed on the left and right side plates of the fixing housing 30. A pair of separation members 37 (FIG. 4 and the others show only one) are disposed between the top part of the fixing housing 30 and the upper portion of the pair of end holders 36. The separation member 37 is, for example, a tensile coil spring that biases the heating member 31 in a direction (upward) to be separated from the pressing roller 32 described later.

A pair of contact plates 38 (see FIG. 6 described later, FIG. 6 and the others show only one) are mounted between the front plate of the fixing housing 30 and the upper portions of the pair of end holders 36. Each contact plate 38 extends diagonally upward from the front plate of the fixing housing 30 toward the rear side, bends and extends diagonally downward on the rear side of the end holder 36, and further bends and extends diagonally upward. That is, each contact plate 38 is formed in a substantially crank-like shape (substantially S-shape) when viewed from the side surface. Each contact plate 38 is provided so as to be swingable (turnable) in the upper-and-lower direction around the connection portion with the front plate of the fixing housing 30.

The heater 35 is a printed board on which a heat-generating resistor to generate heat by being energized is formed on a substrate. The heater 35 is fitted into a recess formed on the lower surface (sliding surface) of the support member 34. The heater 35 is in contact with the inner circumferential surface of the fixing belt 33 and heats the fixing belt 33.

(Pressing roller) The pressing roller 32 as an example of the pressing member is formed in a substantially cylindrical shape elongated in the left-and-right direction by laminating an elastic layer or the like on the outer circumferential surface of a shaft. The pressing roller 32 is supported by the fixing housing 30 in a rotatable manner around an axis. The pressing roller 32 is disposed below the heating member 31, and in contact with the fixing belt 33 from below. The pressing roller 32 faces the heater 35 across the fixing belt 33. A pressurized area N is formed between the fixing belt 33 and the pressing roller 32. The pressing roller 32 is driven by a motor (not shown) to be rotated around the axis, and the fixing belt 33 is rotated in accordance with the pressing roller 32. The pressurized area N refers to an area from a position where the pressure is 0 Pa on the upstream side in the conveyance direction to a position where the pressure is again 0 Pa on the downstream side in the conveyance direction via a position where the pressure acts.

[Image Forming Processing] The operation of the image forming apparatus 1 will be described with reference to FIG. 1 mainly. A control part 15 which controls the image forming apparatus 1 in an integrated manner executes image forming processing (control) on the basis of image data input from an external terminal, for example, as follows.

The charging device 22 charges the surface of the photosensitive drum 21. The optical scanning device 14 exposes the photosensitive drum 21 to form an electrostatic latent image corresponding to the image data on the surface of the photosensitive drum 21. The developing device 23 develops the electrostatic latent image on the photosensitive drum 21 into a toner image using the toner supplied from the toner container 5.

The sheet feeding device 10 separates the sheets S in the sheet feeding cassette 3 one by one, and sends them to the conveyance path 6. The registration rollers pair 8 sends the skew corrected sheet S toward the transfer nip at a predetermined timing. The transfer roller 24 transfers the toner image on the photosensitive drum 21 to the surface of the sheet S passing through the transfer nip. The fixing device 12 heat-fixes the toner image to the sheet S passing through the pressurized area N formed between the fixing belt 33 and the pressing roller 32 (fixing operation). In the case of single-sided printing, the sheet discharge rollers pair 9 discharges the sheet S on which the toner image is fixed, to the sheet discharge tray 4. The cleaning device 25 removes the toner left on the photosensitive drum 21.

In the case of duplex printing, the sheet discharge rollers pair 9 (or the conveying rollers pair) switches back the sheet S, and sends it to the inversion conveyance path 7. The sheet S enters the conveyance path 6 again from the inversion conveyance path 7, and an image is also formed on the back side of the sheet S by the same procedure as in the single-sided printing, and the sheet S having the images on both the sides is discharged to the sheet discharge tray 4.

By the way, a conveyance failure (jam) of the sheet S may occur in the fixing device 12. Specifically, the sheet S may not be able to pass through the pressurized area N and may be jammed. At this time, the user opens the main body cover 2A on the front surface of the apparatus main body 2, exposes the maintenance opening 2B, moves the drum unit 13 and the developing device 23 to the take-out position through the maintenance opening 2B, and then removes the sheet S jammed in the fixing device 12. Since the fixing belt 33 is heated to a high temperature by the heater 35, it is preferable that the user does not accidentally touch it. In addition, since the jammed sheet S is often held in the pressurized area N tightly, the sheet S may not be easily pulled out. Therefore, the image forming apparatus 1 according to the present embodiment includes a jam treatment support part 26 for easily removing the sheet S jammed in the fixing device 12.

Figure 5:
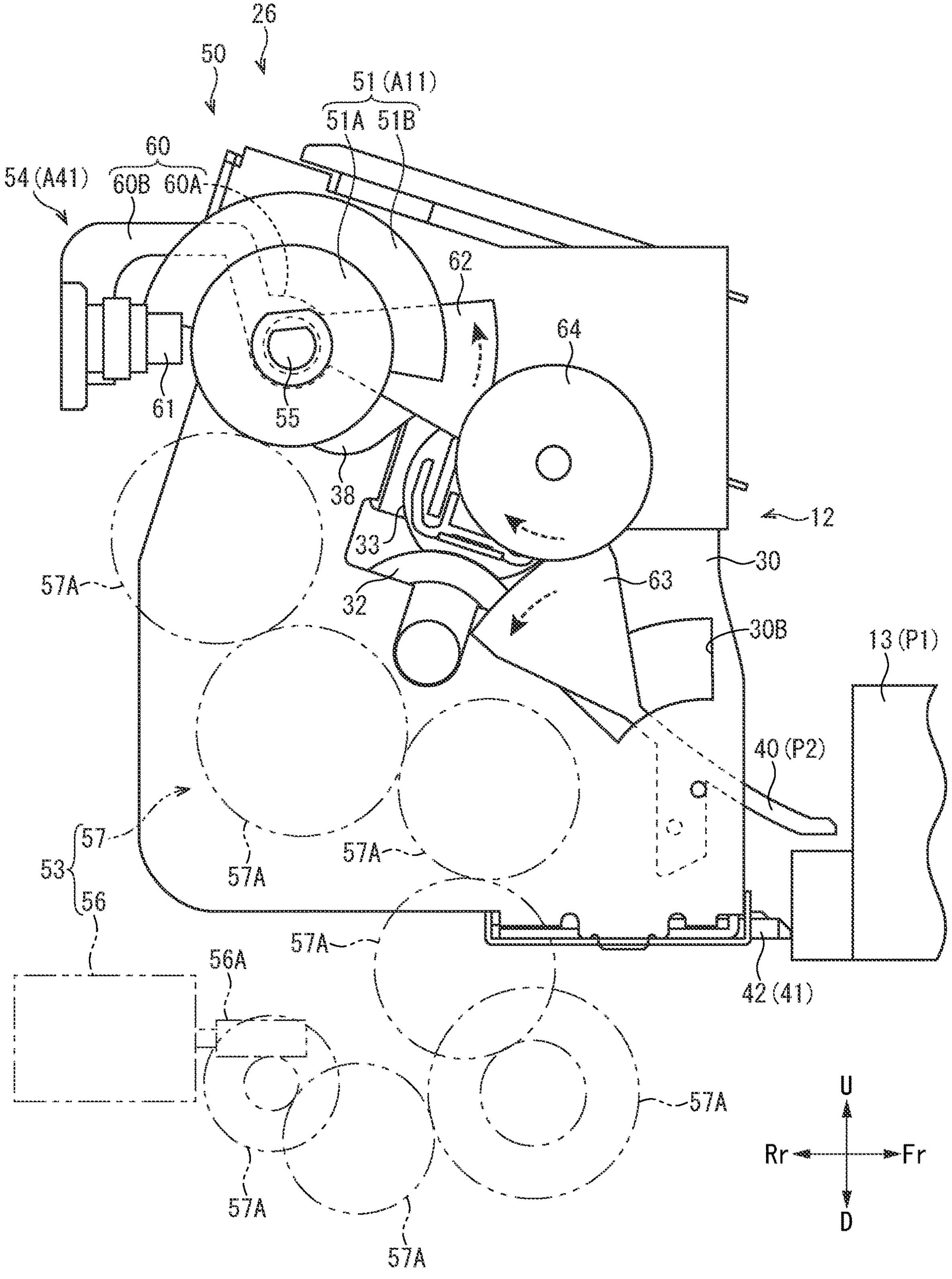
FIG. 5 is a left side view showing the fixing device (at a waiting time) and a pressing interlocking part of the image forming apparatus according to the embodiment of the present disclosure.
Figure 6:
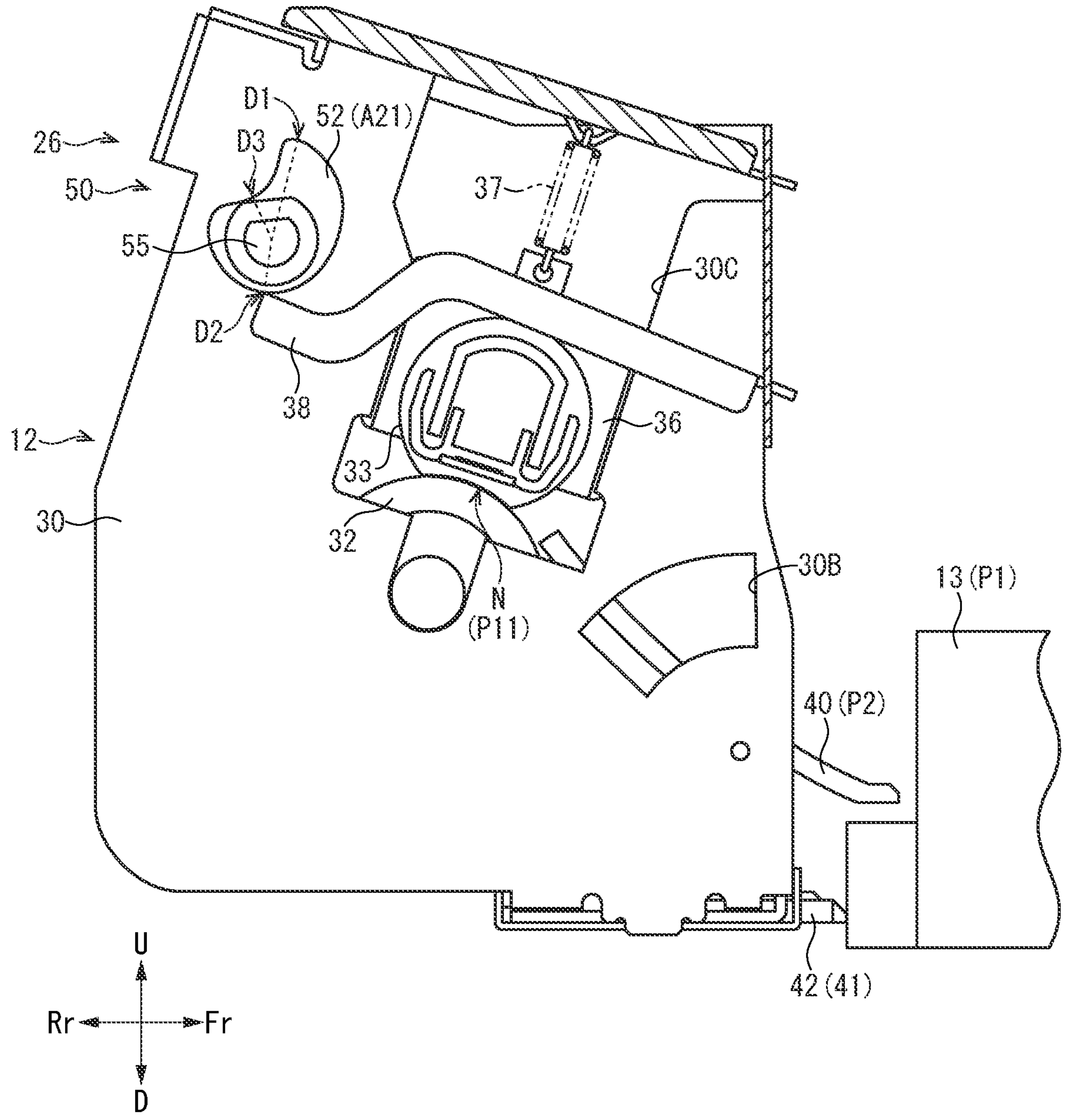
FIG. 6 is a left side view showing the fixing device (in a standby state) and the pressing interlocking part (eccentric cam) of the image forming apparatus according to the embodiment of the present disclosure.

[Jam Treatment Support Part] The jam treatment support part 26 will be described with reference to FIG. 4 to FIG. 6. FIG. 5 is a left side view showing the fixing device 12 (in a standby state) and a pressing interlocking part 50. FIG. 6 is a left side view showing the fixing device 12 (in a standby state) and the pressing interlocking part 50 (eccentric cam 52).

As shown in FIG. 4, the jam treatment support part 26 includes a shutter 40, an opening/closing interlocking part 41, and a pressing interlocking part 50.

<Shutter> In this embodiment, the conveyance guide 40 provided in the fixing housing 30 is also used as the shutter 40. The conveyance guide 40 (shutter 40) is a component of the fixing device 12, but also a component of the jam treatment support part 26 (image forming apparatus 1). In the description of the jam treatment support part 26, the conveyance guide 40 is referred to as the shutter 40, and the shutter 40 has the same reference numeral as the conveyance guide 40.

As shown in FIG. 4, the shutter 40 includes a shutter body part 40A forming a conveyance surface of the sheet S, and a shutter support part 40B extending downward from the shutter body part 40A. The shutter support part 40B is supported by the fixing housing 30 via a shutter shaft 40C. The shutter 40 is provided so as to be turnable (swingable) around the shutter shaft 40C with respect to the fixing housing 30. Specifically, the shutter 40 is provided movably between an opening position P2 for exposing the fixing belt 33 and a closing position P3 for covering the fixing belt 33 (see FIG. 10 described below). When the shutter 40 is moved to the opening position P2, the shutter body part 40A is inclined upward from the front side to the rear side, and the fixing belt 33 can be viewed from the front side. That is, the shutter 40 functions as the conveyance guide 40 for guiding the sheet S conveyed toward the pressurized area N in a state moved to the opening position P2. When the shutter 40 is moved to the closing position P3, the shutter body part 40A becomes steeper than the posture in the opening position P2, and is overlapped with the fixing belt 33 viewed from the front side so that the fixing belt 33 (pressurized area N) cannot be viewed from the front side (see FIG. 10).

<Opening/closing Interlocking Part> As shown in FIG. 4, the opening/closing interlocking part 41 is provided at the front portion of the bottom portion of the fixing housing 30. The opening/closing interlocking part 41 has a straight advancing member 42, a biasing member 43, and an arm member 44.

The straight advancing member 42 is formed in a substantially rectangular parallelepiped shape elongated in the front-and-rear direction, and is supported slidably in the front-and-rear direction on the bottom portion of the fixing housing 30. The leading end of the straight advancing member 42 protrudes forward from the fixing housing 30, and is configured to abut against the rear surface of the drum unit 13 (drum housing 20). The biasing member 43 is, for example, a compression coil spring mounted between a pedestal sheet metal 30A fixed to the fixing housing 30 and the straight advancing member 42. The biasing member 43 biases the straight advancing member 42 forward.

The arm member 44 is a plate material bent in a substantially L-shape, and is connected to the shutter support part 40B and the straight advancing member 42. The arm member 44 is turnably connected to the shutter support part 40B via a first arm shaft 45, and turnably connected to the straight advancing member 42 via a second arm shaft 46. The first arm shaft 45 is provided at the lower portion of the shutter support part 40B below the shutter shaft 40C, and the second arm shaft 46 is provided at the rear portion of the straight advancing member 42. Near the curved portion of the arm member 44, a curved hole 47 curved along the curved portion is opened. An arm support shaft 48 provided in the fixing housing 30 is inserted into the curved hole 47. The arm member 44 is turned (swung) while relatively moving the arm support shaft 48 along the curved hole 47.

<Pressing Interlocking Part> As shown in FIG. 4 to FIG. 6, the pressing interlocking part 50 is mainly provided on the left side surface of the fixing housing 30. The pressing interlocking part 50 includes an actuator 51, a pair of eccentric cams 52, a drive part 53, and a detection part 54. Since the eccentric cams 52 have the same shape, one eccentric cam 52 will be described in the following description, except when specifically stated.

(Actuator) As shown in FIG. 5, the actuator 51 has a final gear 51A and a light shielding plate 51B. The final gear 51A is a spur gear fixed to a coupling shaft 55. The coupling shaft 55 extends in the left-and-right direction, and is rotatably supported by both the left and right side plates of the fixing housing 30. The final gear 51A is fitted into the distal end portion of the coupling shaft 55 formed in a substantially D-shaped cross section. That is, the actuator 51 is provided so as to be rotatable around an axis integrally with the coupling shaft 55. The light shielding plate 51B is integrally formed with the final gear 51A. The light shielding plate 51B is formed in a flange shape extending radially outward from one side where the final gear 51A is halved by the diameter. The light shielding plate 51B is formed in a substantially semicircular shape (substantially fan-like shape) as viewed from the side surface (axial direction).

(Eccentric Cam) As shown in FIG. 6, the eccentric cam 52 is a plate cam which makes the distance from the center of rotation (the axial center of the coupling shaft 55) to the outer circumferential surface non-uniform. The pair of eccentric cams 52 are fixed to the coupling shafts 55 on both the left and right outer sides of the fixing housing 30. The left eccentric cam 52 is disposed closer to the fixing housing 30 (inside) than the actuator 51. The eccentric cam 52 is fitted into the substantially D-shaped cross-sectional portion of the coupling shaft 55, and rotates integrally with the coupling shaft 55. Around the outer circumferential surface of the eccentric cam 52, a cam surface is formed so as to smoothly continue a pressure increasing point D1, a second pressure increasing point D2 and a pressure decreasing point D3. The distance from the axial center of the coupling shaft 55 to the outer circumferential surface (cam surface) is set, in order from the longest to the smallest, the pressure increasing point D1, the second pressure increasing point D2, and the pressure decreasing point D3 (D1>D2>D3). The eccentric cam 52 is provided at a position where the cam surface is brought into contact with the upper surface of the front portion of the contact plate 38 of the fixing housing 30. The eccentric cam 52 is rotatably provided around the same axis as the actuator 51 integrally with the actuator 51 while contacting with the heating member 31 (end holder 36) through the contact plate 38.

(Drive Part) As shown in FIG. 5, the drive part 53 includes a drive motor 56 and a gear train 57. The drive motor 56 is, for example, a DC motor disposed below the fixing device 12. A worm gear 56A is fixed to the output shaft of the drive motor 56. The drive motor 56 is electrically connected to the control part 15 and controlled by the control part to be driven. The gear train 57 has a plurality of transmission gears 57A (spur gears, stepped gears, or the like) supported by the left side plate of the fixing housing 30 in a rotatable manner around an axis. The gear train 57 (the plurality of transmission gears 57A) is provided between the worm gear 56A and the final gear 51A, and transmits the driving force of the drive motor 56 to the final gear 51A (the actuator 51). That is, the drive part 53 rotates the actuator 51 and the eccentric cam 52 around the axis in one direction (in the clockwise direction in FIG. 5). Since the gear on the driving side is the worm gear 56A, be the rotational force cannot transmitted from the final gear 51A (actuator 51) to the gear train 57 (the plurality of transmission gears 57A). Therefore, the drive part 53 has a function of holding the angle of the actuator 51 (eccentric cam 52). The number of transmission gears 57A constituting the gear train 57 may be appropriately changed in consideration of the rotational direction, the deceleration ratio, and the like.

(Detection Part) As shown in FIG. 5, the detection part 54 includes a detection support member 60, a photoelectric sensor 61, a first swing gear 62, a second swing gear 63, and an intermediate gear 64.

The detection support member 60 is disposed between the actuator 51 and the left eccentric cam 52, and is turnably supported by the coupling shaft 55. The detection support member 60 has a shaft support portion 60A through which the coupling shaft 55 penetrates, and a support arm portion 60B extending rearward from the shaft support portion 60A in an inverted U-shape. The detection support member 60 is idle with respect to the coupling shaft 55. The photoelectric sensor 61 is fixed to the tip portion of the support arm portion 60B. The photoelectric sensor 61 is a transmission type optical sensor including a light emitting part (not shown) and a light receiving part (not shown) facing each other with a gap. The light shielding plate 51B of the actuator 51 passes through the gap between the light emitting part and the light receiving part. The photoelectric sensor 61 is electrically connected to the control part 15, and sends a detection signal to the control part 15.

The first swing gear 62 is a fan-shaped gear extended from the shaft support portion 60A forward (in a diagonally lower and front side), and is integrally formed with the detection support member 60. The second swing gear 63 is a fan-shaped gear extended from the left end portion of the shutter 40 rearward (in a diagonally upper and rear side), and is integrally formed with the shutter 40. The second swing gear 63 is disposed outside the left side plate of the fixing housing 30 through a substantially fan-shaped through hole 30B opened in the left side plate. The intermediate gear 64 is a spur gear supported by the left side plate of the fixing housing 30 in a rotatable manner around an axis. The intermediate gear 64 is arranged between the first swing gear 62 and the second swing gear 63, and is meshed with both the swing gears 62, 63. That is, both the swing gears 62, 63 and the intermediate gear 64 transmit the force for opening and closing the shutter 40 to the detection support member 60.

The detection part 54 (detection support member 60) is arranged on the same axis as the actuator 51 (eccentric cam 52), and is provided to be rotatable in conjunction with the shutter 40 separately from the actuator 51. In addition, the detection part 54 (photoelectric sensor 61) detects the actuator 51. Specifically, when the light shielding plate 51B is arranged between the light emitting part and the light receiving part, the light from the light emitting part cannot be received by the light receiving part, and therefore, the photoelectric sensor 61 is turned in an OFF state. When the light shielding plate 51B is separated from the gap between the light emitting part and the light receiving part, the light from the light emitting part is received by the light receiving part, and therefore, the photoelectric sensor 61 is turned to an ON state.

Figure 7:
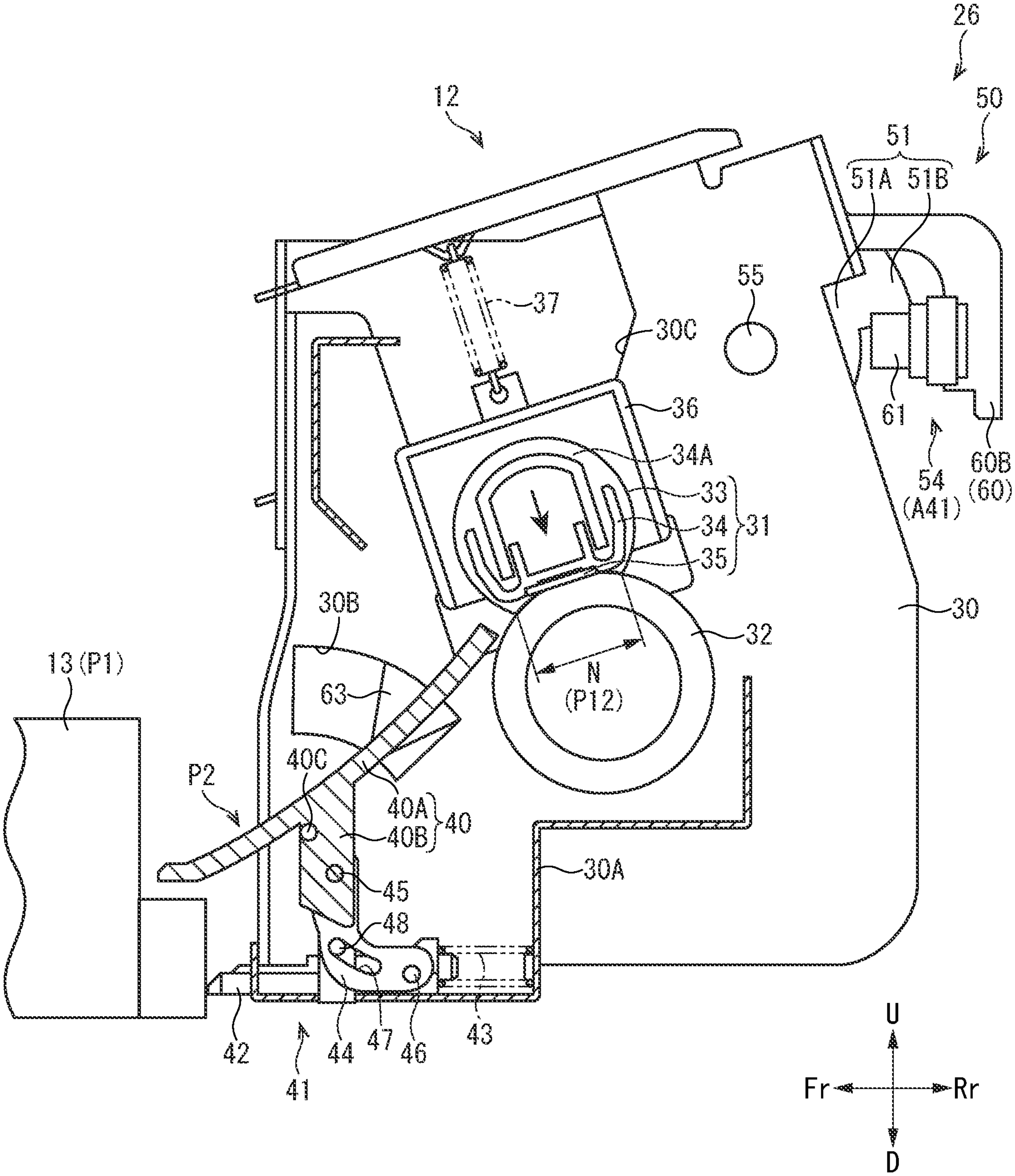
FIG. 7 is a cross-sectional view (right side view) showing the fixing device (in normal operation) and the jam treatment support part of the image forming apparatus according to the embodiment of the present disclosure.
Figure 8:
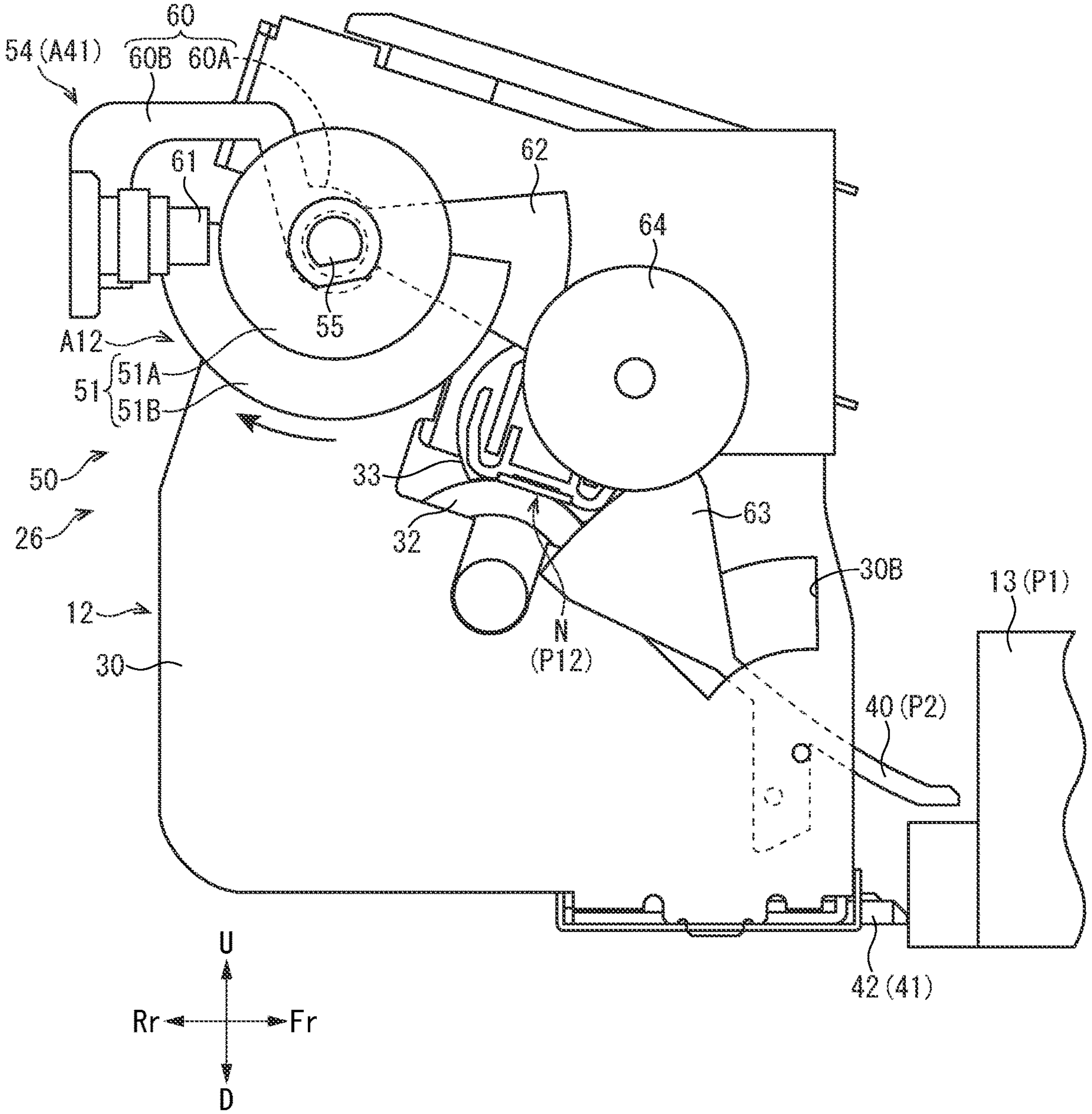
FIG. 8 is a left side view showing the fixing device (in normal operation) and the pressing interlocking part of the image forming apparatus according to the embodiment of the present disclosure.
Figure 9:
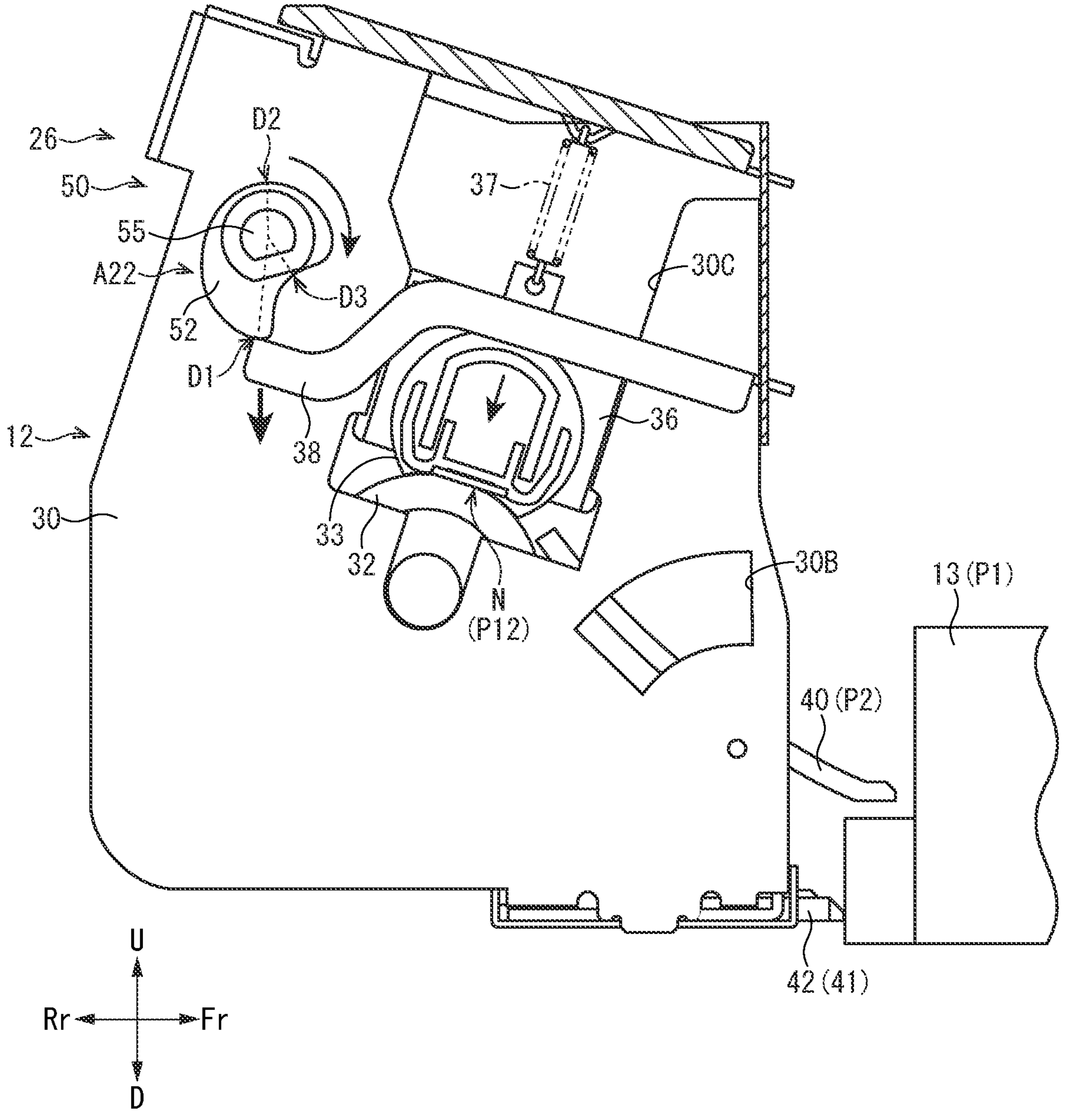
FIG. 9 is a left side view showing the fixing device (in normal operation) and the pressing interlocking part (eccentric cam) of the image forming apparatus according to the embodiment of the present disclosure.
Figure 10:
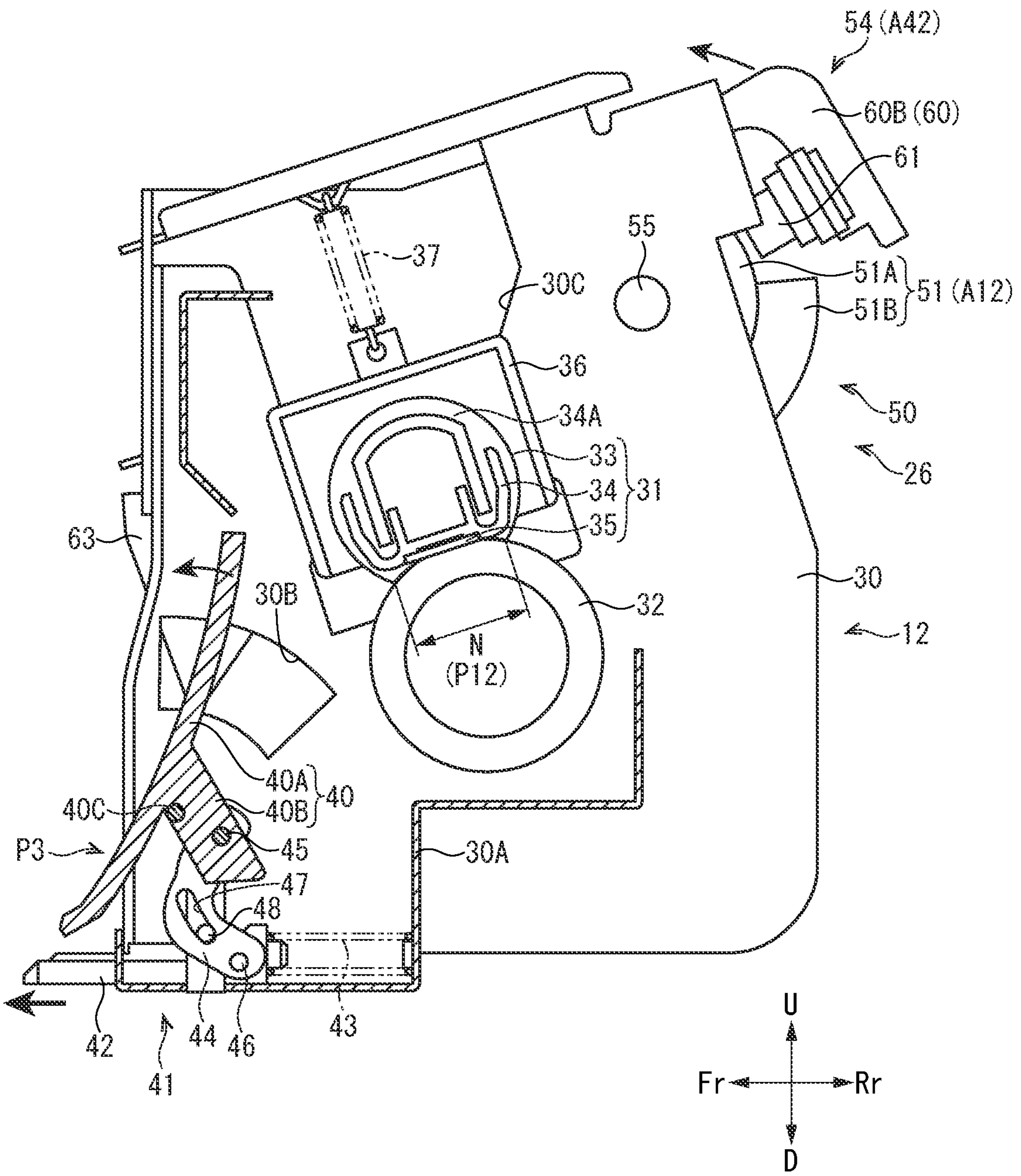
FIG. 10 is a cross-sectional view (right side view) showing the fixing device (in abnormal state, pressure increased state) and the jam treatment support part of the image forming apparatus according to the embodiment of the present disclosure.
Figure 11:
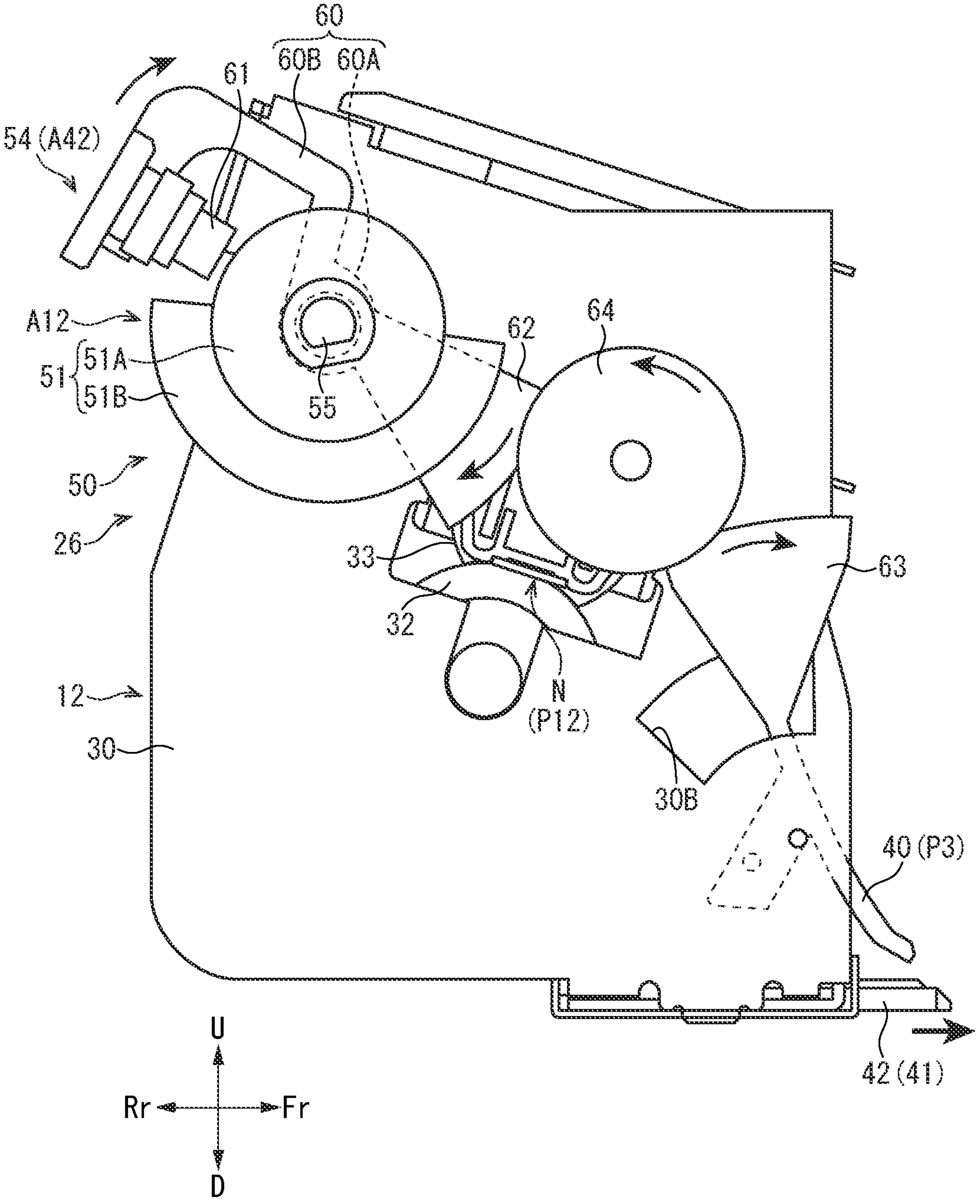
FIG. 11 is a left side view showing the fixing device (in abnormal state, pressure increased state) and the pressing interlocking part of then image forming apparatus according to the embodiment of the present disclosure.
Figure 12:
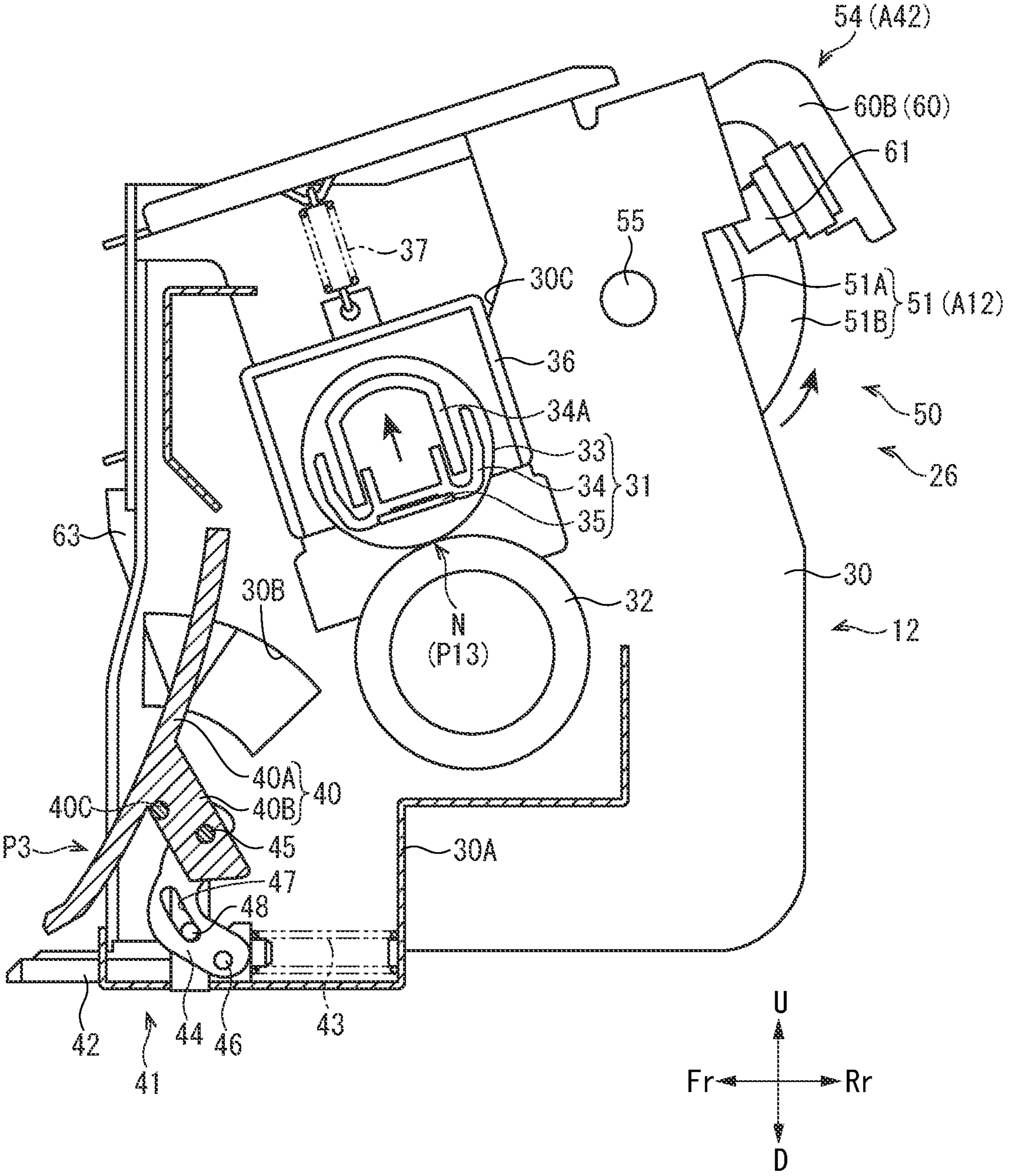
FIG. 12 is a cross-sectional view (right side view) showing the fixing device (in abnormal state, pressure decreased state) and the jam treatment support part of the image forming apparatus according to the embodiment of the present disclosure.
Figure 13:
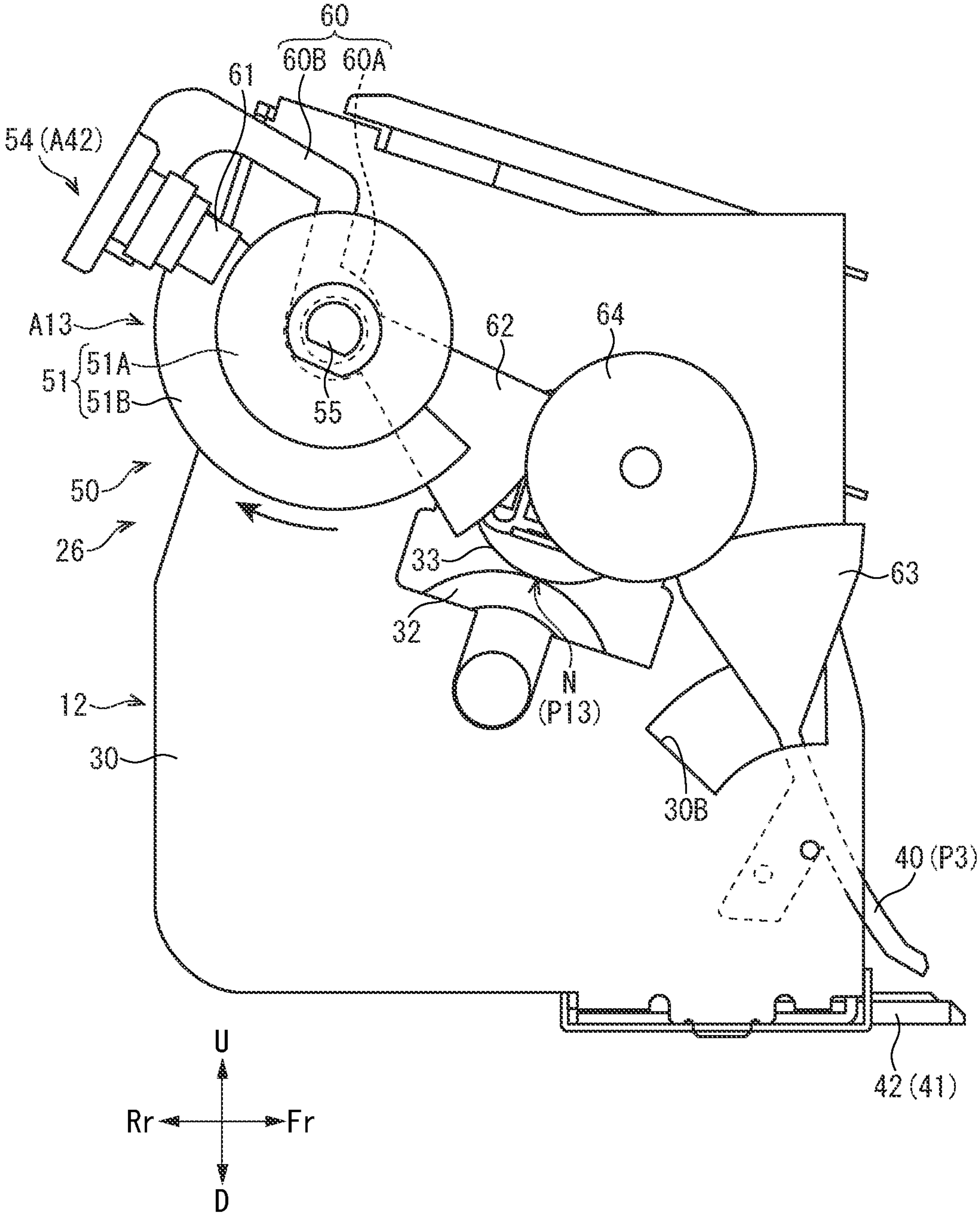
FIG. 13 is a left side view showing the fixing device (in abnormal state, pressure decreased state) and the pressing interlocking part of the image forming apparatus according to the embodiment of the present disclosure.
Figure 14:
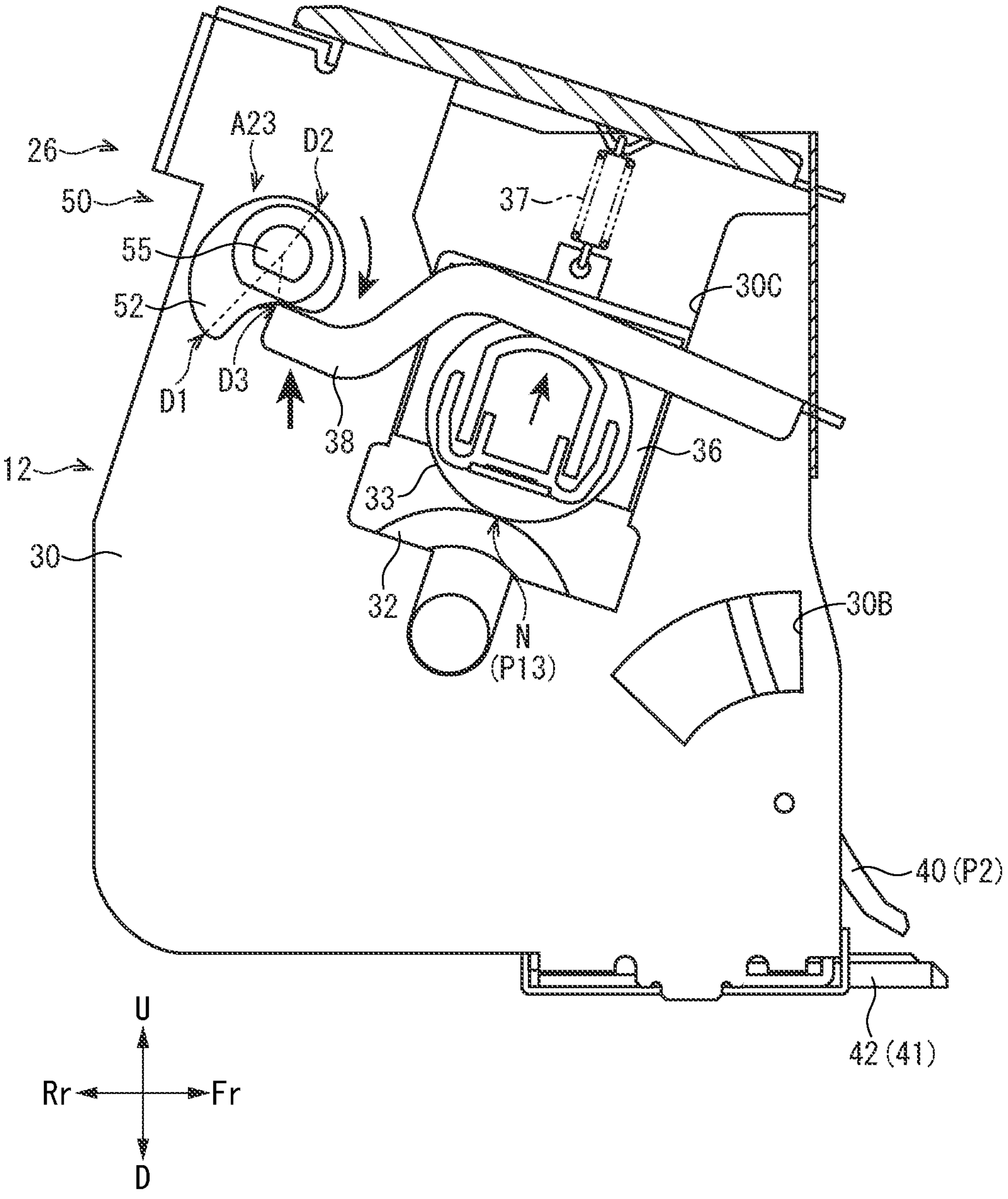
FIG. 14 is a left side view showing the fixing device (in abnormal state, pressure decreased state) and the pressing interlocking part (eccentric cam) of the image forming apparatus according to the embodiment of the present disclosure.

[Operation of Jam Treatment Support Part] Next, the operation of the jam treatment support part 26 will be described with reference to FIG. 4 to FIG. 14. FIG. 7 is a cross-sectional view (right side view) showing the fixing device 12 (in a normal operation) and the jam treatment support part 26. FIG. 8 is a left side view showing the fixing device 12 (in a normal operation) and the pressing interlocking part 50. FIG. 9 is a left side view showing the fixing device 12 (in a normal operation) and the pressing interlocking part 50 (eccentric cam 52). FIG. 10 is a cross-sectional view (right side view) showing the fixing device 12 (in an abnormal state, a pressure increased state P12) and the jam treatment support part 26. FIG. 11 is a left side view showing the fixing device 12 (in an abnormal state, pressure increased state P12) and the pressing interlocking part 50. FIG. 12 is a cross-sectional view (right side view) showing the fixing device 12 (in an abnormal state, pressure decreased state P13) and the jam treatment support part 26. FIG. 13 is a left side view showing the fixing device 12 (in an abnormal state, pressure decreased state P13) the pressing and interlocking part 50. FIG. 14 is a left side view showing the fixing device 12 (in an abnormal state, pressure decreased state P13) and the pressing interlocking part 50 (eccentric cam 52). In the drawings other than FIG. 5, the drive part 53 is not shown.

<In Standby State> When the image forming processing is not performed, that is, when the fixing device 12 (or the image forming apparatus 1) is standby, as shown in FIG. 4, the drum unit 13 (developing device 23) is attached to the attachment position P1 in the apparatus main body 2. The straight advancing member 42 of the opening/closing interlocking part 41 is pushed into the fixing housing 30 against the biasing force of the biasing member 43, and abuts against the rear portion of the drum unit 13. The shutter 40 is held at the opening position P2, and is used as the conveyance guide 40.

In addition, when the fixing device 12 is standby, as shown in FIG. 5, the second swing gear 63 coupled to the shutter 40 is disposed on the rear side of the through hole 30B of the fixing housing 30, and the front teeth are meshed with the intermediate gear 64. The lower teeth of the first swing gear 62 coupled to the detection support member 60 are meshed with the intermediate gear 64. The detection support member 60 (detection part 54) is held at a first detection angle A41 in a substantially horizontally extended posture. The actuator 51 is held at a standby angle A11 by the drive part 53 (gear train 57) with the light shielding plate 51B facing upward. At this time, the light shielding plate 51B is separated from between the light emitting part and the light receiving part, and the photoelectric sensor 61 is turned in the ON state. As described above, since the drive part 53 holds the actuator 51 at the standby angle A11, the detection part 54 (photoelectric sensor 61) held at the first detection angle A41 does not detect the actuator 51.

In addition, when the fixing device 12 is standby, as shown in FIG. 6, the eccentric cam 52 is held at a second pressure increasing angle A21 with the second pressure increasing point D2 in contact with the contact plate 38, and pushes down the heating member 31 against the biasing force of the separation member 37. Thus, the fixing belt 33 is pressed against the pressing roller 32, and the pressurized area N is set to a second pressure increased state P11 (see also FIG. 4). The second pressure increased state P11 refers to a state in which the pressure of the pressurized area N during the fixing operation (pressure increased state P12 (see FIG. 7)) is decreased.

<During Image Forming Processing (Normal Operation)> Next, when the fixing device 12 that has been standby performs the fixing operation (when the fixing operation is being performed), that is, when the image forming processing is performed from the standby state, as shown in FIG. 7, the drum unit 13 is held at the attachment position P1, and the shutter 40 is held at the opening position P2. As shown in FIG. 7 and FIG. 8, the detection support member 60 (detection part 54) is held at the first detection angle A41.

When the fixing operation is performed, the drive motor 56 is controlled by the control part 15 to be driven to rotate the final gear 51A (actuator 51) in one direction (the clockwise direction in FIG. 8). When the final gear 51A is rotated further and the light shielding plate 51B enters between the light emitting part and the light receiving part, the photoelectric sensor 61 is turned in the OFF state, and the control part 15 stops the drive motor 56. That is, the control part 15 drives the drive motor 56 until a detection signal indicating the OFF state is received from the photoelectric sensor 61. When the fixing operation is being performed, the detection support member 60 (detection part 54) is held at the first detection angle A41, and the actuator 51 is held at a standard angle A12 with the light shielding plate 51B facing downwards by the drive part 53 (gear train 57). As described above, when the drive part 53 rotates the actuator 51 from the standby angle A11 to the standard angle A12 and holds it as it is, the detection part 54 (photoelectric sensor 61) held at the first detection angle A41 detects the actuator 51.

When the fixing operation is performed, as shown in FIG. 9, the eccentric cam 52 is rotated to a pressure increasing angle A22 for bringing the pressure increasing point D1 into contact with the contact plate 38. The eccentric cam 52 is held at the pressure increasing angle A22, and pushes down the heating member 31 further against the biasing force of the separation member 37 to bring the pressurized area N into the pressure increased state P12 capable of performing the fixing operation (see also FIG. 7). As described above, the eccentric cam 52 is rotated (is held) from the second pressure increasing angle A21 to the pressure increasing angle A22 and to bring the pressurized area N from the second pressure increased state P11 to the pressure increased state P12. In the pressure increased state P12, the length of the pressurized area N in the conveyance direction is the longest.

When returning to the standby state after the image forming processing is finished, the drive part 53 rotates the actuator 51 in the clockwise direction in FIG. 8 to the standby angle A11. That is, the control part 15 drives the drive motor 56 until a detection signal indicating the ON state is received from the photoelectric sensor 61 (see FIG. 4 to FIG. 6).

<When Jam Occurs (Abnormal State)> When the sheet S conveyance failure (jam) occurs in the fixing device 12 performing the fixing operation, the image forming apparatus 1 (control part 15) interrupts the image forming processing. Thereafter, the user opens the main body cover 2A on the front surface of the apparatus main body 2 and draws out the drum unit 13 and the developing device 23 from the attachment position P1 to the take-out position through the maintenance opening 2B. With the drawing out of the drum unit 13, the straight advancing member 42 is biased forward by the biasing member 43. As the straight advancing member 42 is drawn out, the arm member 44 is turned around the arm shafts 45, 46 and is turned in the clockwise direction in FIG. 10 while moving the arm support shaft 48 relatively along the curved hole 47. As the turning of the arm member 44, the shutter 40 is turned in the counterclockwise direction in FIG. 10 around the shutter shaft 40C, and is moved to the closing position P3. As described above, when the drum unit 13 is drawn out from the attachment position P1, the shutter 40 is moved from the opening position P2 to the closing position P3, and covers (hides) the heating member 31 (pressurized area N) when viewed from the front side. In this embodiment, the shutter 40 does not cover the entire heating member 31, but covers the entire heating member 31 together with the plate member of the fixing housing 30 (see FIG. 10). A gap is formed between the upper end of the shutter 40 and the plate member of the fixing housing 30 to the extent that the sheet S can be pulled out (see FIG. 10).

In addition, when a jam occurs, as shown in FIG. 11, the second swing gear 63 coupled to the shutter 40 is moved from the rear side to the front side through the through hole 30B of the fixing housing 30, and rotates the intermediate gear 64 in the counterclockwise direction in FIG. 11. The intermediate gear 64 rotates the first swing gear 62 coupled to the detection support member 60 in the clockwise direction in FIG. 11. In this state, the rear teeth of the second swing gear 63 are meshed with the intermediate gear 64, and the upper teeth of the first swing gear 62 are meshed with the intermediate gear 64. The detection support member 60 (detection part 54) is turned to a second detection angle A42 which is separated upward from the actuator 51 held at the standard angle A12. The detection support member 60 turned to the second detection angle A42 is in a posture inclined upward from the front side to the rear side, and is held in that posture. In this state, since the photoelectric sensor 61 is separated upward from the light shielding plate 51B, it is turned in the ON state. That is, the photoelectric sensor 61 temporarily stops detecting the actuator 51.

In addition, when a jam occurs, as shown in FIG. 13, the drive motor 56 is controlled by the control part 15 to be driven to rotate the final gear 51A in one direction (the clockwise direction in FIG. 13). When the final gear 51A is further rotated and the light shielding plate 51B enters between the light emitting part and the light receiving part, the photoelectric sensor 61 temporarily turned in the ON state is again turned in the OFF state, and the control part 15 stops the drive motor 56. That is, when the control part 15 receives the detection signal indicating the ON state from the photoelectric sensor 61 while the drive motor 56 is stopped, it drives the drive motor 56 until it receives the detection signal indicating the OFF state from the photoelectric sensor 61. The actuator 51 is held by the drive part 53 (gear train 57) at an emergency angle A13 with the light shielding plate 51B facing in a diagonally rear and lower side. As described above, when the drive part 53 rotates the actuator 51 from the standard angle A12 to the emergency angle A13, the detection part 54 (photoelectric sensor 61) held at the second detection angle A42 detects the actuator 51.

In addition, when a jam occurs, as shown in FIG. 14, the eccentric cam 52 is rotated to the pressure decreasing angle A23 for bringing the pressure decreasing point D3 into contact with the contact plate 38, and is held at that angle. The heating member 31 is pulled up by the separation member 37 and presses the contact plate 38 against the pressure decreasing point D3 of the eccentric cam 52 (see also FIG. 12). The pressurized area N is in the pressure decreased state P13 in which the fixing belt 33 is separated from the pressing roller 32. Thus, the eccentric cam 52 rotates from the pressure increasing angle A22 to the pressure decreasing angle A23 to bring the pressurized area N into the pressure decreased state P13. In this state, the user removes the jammed sheet S. In the pressure decreased state P13, since the fixing belt 33 is separated from the pressing roller 32, the pressurized area N is not formed, but it is preferable to assume that the pressure of the part which forms the pressurized area N is decreased.

<After Jam Treatment> When the fixing device 12 in which the sheet S conveyance failure has occurred returns to the standby state, that is, returns to the standby state after the finish of the jam treatment, the user returns the drum unit 13 and the developing device 23 from the take-out position to the attachment position P1, and closes the main body cover 2A on the front surface of the apparatus main body 2 (see FIG. 1). The straight advancing member 42 is pushed by the drum unit 13, and pushed into the fixing housing 30 against the biasing force of the biasing member 43 (see FIG. 4). As the straight advancing member 42 is pushed in, the arm member 44 is turned in the counterclockwise direction in FIG. 12, and the shutter 40 is turned in the clockwise direction in FIG. 12 and moved to the opening position P2 (see FIG. 4). As described above, with the drum unit 13 attached to the attachment position P1, the shutter 40 is moved from the closing position P3 to the opening position P2.

In addition, when returning to the standby state after the finish of the jam treatment, the second swing gear 63 is moved from the front side to the rear side in the through hole 30B to rotate the intermediate gear 64 in the clockwise direction in FIG. 13, and the intermediate gear 64 rotates the first swing gear 62 in the counterclockwise direction in FIG. 13. In this state, the front teeth of the second swing gear 63 are meshed with the intermediate gear 64, and the lower teeth of the first swing gear 62 are meshed with the intermediate gear 64 (see FIG. 5). The detection support member 60 (detection part 54) is turned from the second detection angle A42 to the first detection angle A41 (see FIG. 5). In this state, the photoelectric sensor 61 is turned in the OFF state and continues to detect the actuator 51.

In addition, when returning to the standby state after the finish of the jam treatment, the drive motor 56 is controlled by the control part 15 to be driven to rotate the final gear 51A in one direction (in the clockwise direction in FIG. 13). When the final gear 51A is further rotated and the light shielding plate 51B is separated from between the light emitting part and the light receiving part, the photoelectric sensor 61 is turned from the OFF state to the ON state, and the control part 15 stops the drive motor 56. That is, the control part 15 drives the drive motor 56 until the detection signal indicating the ON state is received from the photoelectric sensor 61. The actuator 51 is held at the standby angle A11 by the drive part 53 (gear train 57) (see FIG. 5). As described above, when the drive part 53 rotates the actuator 51 from the emergency angle A13 to the standby angle A11, the detection part 54 (photoelectric sensor 61) held at the first detection angle A41 does not detect the actuator 51.

In addition, when returning to the standby state after the finish of the jam treatment, the eccentric cam 52 is rotated from the pressure decreasing angle A23 to the second pressure increasing angle A21 to change the pressurized area N from the pressure decreased state P13 to the second pressure increased state P11 (see FIG. 6).

In the image forming apparatus 1 according to the present embodiment described above, when the drum unit 13 is attached to the attachment position P1 of the apparatus main body 2, the opening/closing interlocking part 41 moves the shutter 40 to the opening position P2 (see FIG. 4), and when the drum unit 13 is drawn out from the attachment position P1, the opening/closing interlocking part 41 moves the shutter 40 to the closing position P3 (see FIG. 10). Further, when the shutter 40 is moved to the opening position P2, the pressing interlocking part 50 moves the heating member 31 in the direction of pressing against the pressing roller 32 to set the pressurized area N to the pressure increased state P12 (see FIG. 9), and when the shutter 40 is moved to the closing position P3, the pressing interlocking part 50 moves the heating member 31 in the direction of separating away from the pressing roller 32 to set the pressurized area N to the pressure decreased state P13 (see FIG. 14). Specifically, in a normal operation, the shutter 40 is arranged at the opening position P2, the detection part 54 is held at the first detection angle A41, the actuator 51 held at the standard angle A12 is detected by the detection part 54, and the eccentric cam 52 held at the pressure increasing angle A22 sets the pressurized area N to the pressure increased state P12 (see FIG. 7 to FIG. 9). When a jam occurs (in an abnormal state), as the drum unit 13 is drawn out, the shutter 40 is moved to the closing position P3, the detection part 54 is turned to the second detection angle A42, the actuator 51 turned to the emergency angle A13 is detected by the detection part 54, and the eccentric cam 52 is rotated to the pressure decreasing angle A23 to bring the pressurized area N to the pressure decreased state P13 (see FIG. 12 to FIG. 14). According to this configuration, when the drum unit 13 is drawn out from the attachment position P1, the pressure of the pressurized area N can be decreased automatically while the heating member 31 is covered with the shutter 40. Thereby, the possibility that the user touches the heating member 31 when removing the sheet S under the conveyance failure can be reduced, and the sheet S under the conveyance failure can be easily removed.

The image forming apparatus 1 according to the present embodiment is configured such that, in response to opening and closing of the shutter 40, the detection part 54 is turned between the first detection angle A41 and the second detection angle A42, and the drive part 53 rotates the actuator 51 and the others in one direction so that the detection part 54 detects the presence or absence of the actuator 51 (see FIG. 11, FIG. 13). According to this configuration, based on the output from the one detection part 54, the driving of the drive part 53 is controlled, and three states of standby, normal operation, and abnormal state can be detected. As a result, the structure of the pressing interlocking part 50 can be simplified and the driving control of the drive part 53 can be simplified, compared with the case where the drive part 53 is controlled by providing a plurality of sensors.

In addition, according to the image forming apparatus 1 according to the present embodiment, the shutter 40 can also be used as the conveyance guide 40 for guiding the conveyance of the sheet S. Further, the drum unit 13 can also be used as the attachable/detachable member for opening/closing the shutter 40 in cooperation with the opening/closing interlocking part 41. As a result, the number of components constituting the image forming apparatus 1 is reduced compared with the case where the conveyance guide 40 is provided separately from the shutter 40 or the attachable/detachable member is provided separately from the drum unit 13, thereby reducing the manufacturing cost.

In the image forming apparatus 1 according to the present embodiment, the actuator 51 of the pressing interlocking part 50 is turned at three angles including the standby angle A11, the standard angle A12, and the emergency angle A13, but the present disclosure is not limited thereto. The actuator 51 may be rotated to at least two angles including the standard angle A12 and the emergency angle A13. That is, one detection part 54 can detect at least two states of the normal operation state and the abnormal state. In this case, the drive part 53 may be controlled to rotate the actuator 51 forward and rearward (reciprocating rotation). Further, the cam surface of the eccentric cam 52 may have the pressure increasing point D1 and the pressure decreasing point D3.

In the image forming apparatus 1 according to the present embodiment, when the pressurized area N of the fixing device 12 is set to the pressure decreased state P13, the fixing belt 33 is separated from the pressing roller 32, but the present disclosure is not limited thereto. The pressure decreased state P13 does not mean to require that the pressure in the pressurized area N be reduced to 0, but may be reduced below the second pressure increased state P11, and the fixing belt 33 may be in light contact with the pressing roller 32 (not shown). In addition, in the image forming apparatus 1 according to the present embodiment, the pressing roller 32 of the fixing device 12 is driven to be rotated, and the fixing belt 33 is rotated in accordance with the pressing roller 32, but the present disclosure is not limited thereto. For example, the fixing belt 33 may be driven to be rotated, and the pressing roller 32 may be rotated in accordance with the fixing belt 33.

In the image forming apparatus 1 according to the present embodiment, the opening/closing of the shutter 40 is interlocked with the attachment/detachment of the drum unit 13 as an example of the attachable/detachable member, but the present disclosure is not limited thereto. For example, the opening/closing of the shutter 40 may be interlocked with the attachment/detachment of the toner container 5 (another example of the attachable/detachable member), or a dedicated attachable/detachable member (not shown) may be provided.

In the image forming apparatus 1 according to the present embodiment, the eccentric cam 52 is in contact with the heating member 31 through the contact plate 38, but the present disclosure is not limited thereto. For example, the eccentric cam 52 may be provided in contact with the end holder 36 of the heating member 31 (not shown). For example, the eccentric cam 52 may be provided in contact with the pressing roller 32 (such as a shaft), and the pressing roller 32 may be pressed against (or pulled away from) the fixing belt 33 (not shown).

In the image forming apparatus 1 according to the present embodiment, although the photoelectric sensor 61 of the detection part 54 is a transmission type optical sensor, it is not limited thereto, and may be, for example, a reflection type optical sensor (not shown). In the case of the reflective light sensor, the actuator 51 may be provided with a reflective plate instead of the light shielding plate 51B (not shown). As a means for detecting the actuator 51, a micro-switch or the like may be provided instead of the photoelectric sensor 61 (not shown).

The image forming apparatus 1 according to the present embodiment is a so-called printer, but it is not limited to this, and may be a copying machine, facsimile machine, multifunctional peripheral, or the like.

The description of the above embodiment shows one aspect of the image forming apparatus according to the present disclosure, and the technical scope of the present disclosure is not limited to the above embodiment. The present disclosure may be variously modified, substituted, or modified to the extent that it does not deviate from the purport of technical thought, and the claims include all embodiments that may be included within the scope of technical thought.

The invention claimed is:

1. An image forming apparatus comprising:

a drum unit including a photosensitive drum on which a toner image is formed, and detachably attached to an apparatus main body;

a transfer roller which transfers the toner image from the photosensitive drum to a medium;

a fixing device provided on an upstream side of the drum unit in a draw-out direction of the drum unit, and configured to heat-fix a toner image on the medium passing through a pressurized area formed between a heating member and a pressing member;

a shutter provided to be movable between an opening position for exposing the heating member and a closing position for covering the heating member;

an opening/closing interlocking part configured to move the shutter to the opening position when the drum unit is attached to an attachment position of the apparatus main body, and to move the shutter to the closing position when the drum unit is drawn out from the attachment position; and a pressing interlocking part configured to move one of the heating member and the pressing member in a direction of pressing it against the other to bring the pressurized area into a pressure increased state when the shutter is moved to the opening position, and to move one of the heating member and the pressing member in a direction of separating it away from the other to bring the pressurized area into a pressure decreased state when the shutter is moved to the closing position, the pressing interlocking part includes:

an actuator configured to be rotatable around an axis;

an eccentric cam configured to be rotatable together with the actuator around the axis while in contact with one of the heating member and the pressing member;

a drive part rotating the actuator and the eccentric cam around the axis; and a detection part arranged on the same axis as the actuator, configured to be rotatable separately from the actuator in conjunction with the shutter and to detect the actuator, wherein in a case where the fixing device is performing a fixing operation, the drum unit is attached to the attachment position, the shutter is moved to the opening position, the detection part is held at a first detection angle, and the drive part holds the actuator at a standard angle, so that the detection part held at the first detection angle detects the actuator, and the eccentric cam is held at a pressure increasing angle to bring the pressurized area into the pressure increased state, and in a case where a conveyance failure of the medium occurs in the fixing device performing the fixing operation, when the drum unit is drawn out from the attachment part, the shutter is moved from the opening position to the closing position, the detection part is rotated to a second detection angle separated from the actuator held at the standard angle, and the drive part rotates the actuator from the standard angle to an emergency angle, so that the detection part held at the second detection angle detects the actuator, and the eccentric cam is rotated from the pressure increasing angle to a pressure decreasing angle to bring the pressurized are into the pressure decreased state.

2. The image forming apparatus according to claim 1, wherein the drive part rotates the actuator and the eccentric cam in one direction, when the fixing device is standby, the drum unit is attached to the attachment position, the shutter is moved to the opening position, the detection part is held at the first detection angle, and the drive part holds the actuator at a standby angle, so that the detection part held at the first detection angle does not detect the actuator, and the eccentric cam is held at a second pressure increasing angle to bring the pressurized area into a second pressure increased state reduced from the pressure increased state, when the standby fixing device performs the fixing operation, the drum unit is attached to the attachment position, the shutter is moved to the opening position, the detection part is held at the first detection angle, and the drive part rotates the actuator from the standby angle to the standard angle, so that the detection part held at the first detection angle detects the actuator, and the eccentric cam rotates from the second pressure increasing angle to the pressure increasing angle to bring the pressurized area from the second pressure increased state to the pressure increased state, and when the fixing device in which a conveyance failure of the medium has occurred returns to the standby state, the drum unit is attached to the attachment position, the shutter is moved from the closing position to the opening position, the detection part is rotated from the second detection angle to the first detection angle, and the drive part rotates the actuator from the emergency angle to the standby angle, so that the detection part held at the first detection angle does not detect the actuator, and the eccentric cam is rotated from the pressure decreasing angle to the second pressure increasing angle to bring the pressurized area from the pressure decreased state to the second pressure increased state.

3. The image forming apparatus according to claim 1, wherein in a state where the shutter is moved to the opening position, the shutter functions as a conveyance guide which guides the medium to be conveyed to the pressurized area.

4. The image forming apparatus according to claim 1, wherein the detection part includes:

a detection support member idled with respect to a rotational shaft of the actuator;

a sensor fixed to the detection support member, and switched in an ON state and an OFF state in response to the actuator;

a first swing gear integrally formed with the detection support member;

a second swing gear integrally formed with the shutter; and an intermediate gear meshed with the first swing gear and the second swing gear.

* * * * *